(12) United States Patent
Colglazier

(10) Patent No.: US 11,030,115 B2
(45) Date of Patent: Jun. 8, 2021

(54) DATALESS CACHE ENTRY

(71) Applicant: LENOVO Enterprise Solutions (Singapore) PTE. LTD., New Tech Park (SG)

(72) Inventor: Daniel J Colglazier, Cary, NC (US)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 179 days.

(21) Appl. No.: 16/455,219

(22) Filed: Jun. 27, 2019

(65) Prior Publication Data

US 2020/0409867 A1    Dec. 31, 2020

(51) Int. Cl.
*G06F 12/12* (2016.01)
*G06F 12/126* (2016.01)

(52) U.S. Cl.
CPC .... *G06F 12/126* (2013.01); *G06F 2212/1021* (2013.01); *G06F 2212/1044* (2013.01)

(58) Field of Classification Search
CPC ........... G06F 12/126; G06F 2212/1021; G06F 2212/1044
See application file for complete search history.

(56) References Cited

U.S. PATENT DOCUMENTS

| 10,489,300 | B1* | 11/2019 | Nampoothiri | G06F 12/0886 |
| 2007/0168619 | A1* | 7/2007 | Hutton | G06F 12/0824 |
| | | | | 711/141 |
| 2010/0281218 | A1* | 11/2010 | Shen | G06F 12/127 |
| | | | | 711/125 |
| 2016/0070651 | A1* | 3/2016 | Shwartsman | G06F 12/0897 |
| | | | | 711/122 |
| 2016/0124856 | A1* | 5/2016 | Forsell | G06F 9/3851 |
| | | | | 711/128 |
| 2019/0391924 | A1* | 12/2019 | Hirano | G06F 12/0811 |

FOREIGN PATENT DOCUMENTS

JP    2002268943 A  *  4/2004

* cited by examiner

*Primary Examiner* — Masud K Khan
(74) *Attorney, Agent, or Firm* — Kunzler Bean & Adamson; Bruce R. Needham

(57) ABSTRACT

An apparatus for using a dataless cache entry includes a cache memory and a cache controller configured to identify a first cache entry in cache memory as a potential cache entry to be replaced according to a cache replacement algorithm, compare a data value of the first cache entry to a predefined value, and write a memory address tag and state bits of the first cache entry to a dataless cache entry in response to the data value of the first cache entry matching the predefined value, wherein the dataless cache entry in the cache memory stores a memory address tag and state bits associated with the memory address, wherein the dataless cache entry represents the predefined value, and wherein the dataless cache entry occupies fewer bits than the first cache entry.

20 Claims, 7 Drawing Sheets

DATALESS CACHE ENTRY

FIELD

The subject matter disclosed herein relates to cache memory and more particularly relates to a dataless cache entry and its use.

BACKGROUND

Hardware caches store data near a processor but are limited in size. Retrieving data from the cache is quicker than retrieving data from the main memory. Conventional cache entries store a block of data, which may be copied from the main memory.

BRIEF SUMMARY

An apparatus for using a dataless cache entry includes a cache memory including a dataless cache entry. Here, the dataless cache entry may store a memory address tag and state bits associated with the memory address tag and the dataless cache entry represents the predefined value. The apparatus may also include a cache controller that identifies a first cache entry in the cache memory as a potential cache entry to be replaced according to a cache replacement algorithm, compares a data value of the first cache entry to a predefined value, and writes a memory address tag and state bits of the first cache entry to the dataless cache entry in response to the data value of the first cache entry matching the predefined value. Here, the dataless cache entry occupies fewer bits than the first cache entry.

A method for using a dataless cache entry is disclosed. The method includes identifying a first cache entry in cache memory as a potential cache entry to be replaced according to a cache replacement algorithm, comparing a data value of the first cache entry to a predefined value, and storing a memory address tag and state bits of the first cache entry to a dataless cache entry in response to the data value of the first cache entry matching the predefined value. Here, the dataless cache entry in the cache memory may store a memory address tag and state bits associated with the memory address tag and the dataless cache entry represents the predefined value, such that the dataless cache entry occupies fewer bits than the first cache entry.

A system for using a dataless cache entry includes a central processing unit ("CPU"), a main memory, a CPU cache and a cache controller, where data from the main memory is fetched to the CPU cache. In various embodiments, the CPU cache may include a set of dynamic-value cache entries and a fixed-value entry. Here, the fixed-value cache entry in the cache memory stores a memory address tag and state bits associated with the memory address tag and the dataless cache entry represents the predefined value, such that the fixed cache entry occupies fewer bits than a dynamic-value cache entry. In various embodiments, the cache controller is configured to identify a first dynamic-value cache entry as a potential cache entry to be replaced according to a cache replacement algorithm and compare a data value of the first dynamic-value cache entry to a predefined value. In response to the data value of the first dynamic-value cache entry matching the predefined value, the cache controller writes a memory address tag and state bits of the first dynamic-value cache entry to the fixed-value cache entry.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
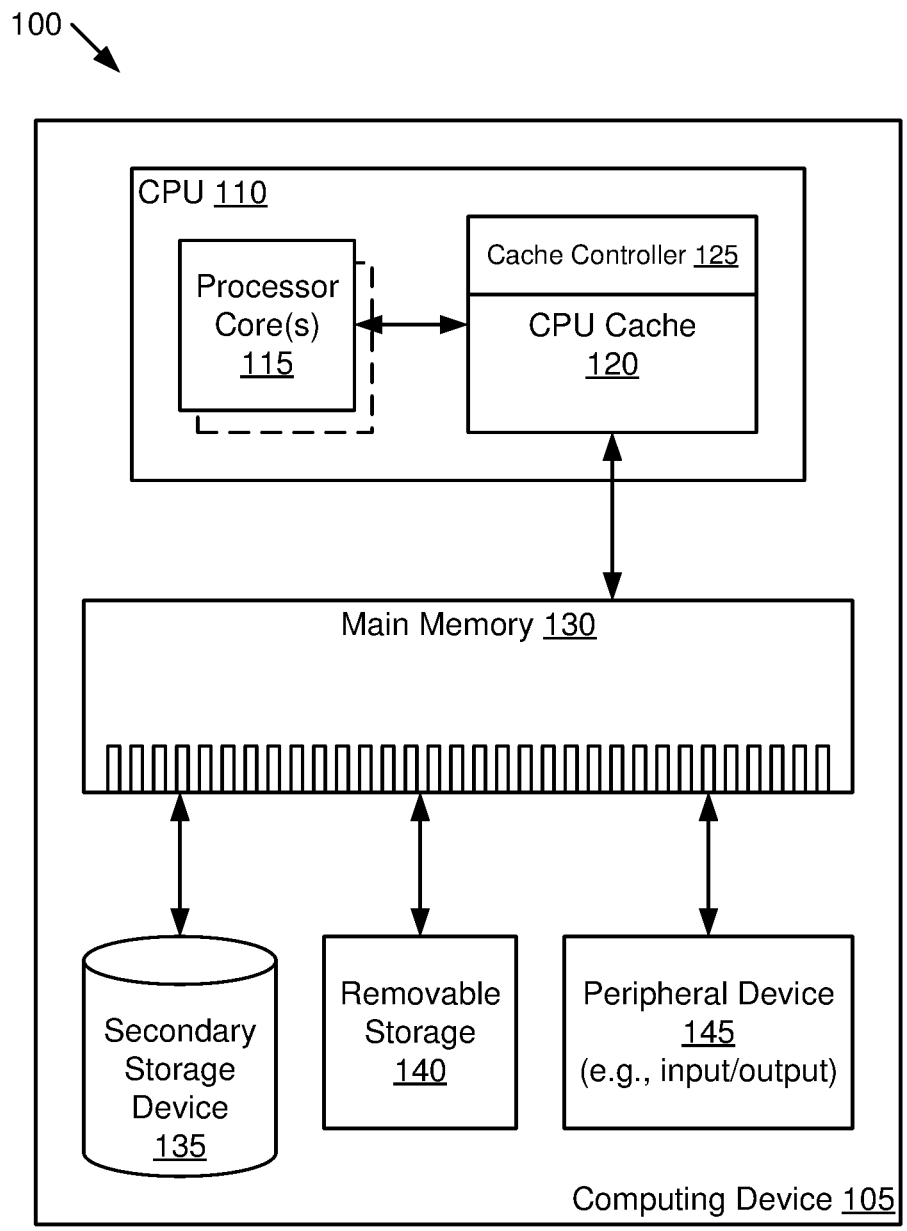
FIG. 1 is a schematic block diagram illustrating one embodiment of a system for using a dataless cache entry.

As will be appreciated by one skilled in the art, aspects of the embodiments may be embodied as a system or method. Accordingly, embodiments may take the form of an entirely hardware embodiment or an embodiment combining software (including firmware, resident software, micro-code, etc.) and hardware aspects that may all generally be referred to herein as a "circuit," "stripper," "reader," "encapsulator," "writer," "system," etc. Furthermore, portions of embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a hard disk, a random access memory (RAM), a read-only memory (ROM), an erasable programmable read-only memory (EPROM or Flash memory), a magnetic storage device, and the like or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, user selections, network transactions, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that some of the blocks of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures. The blocks of the schematic flowchart diagrams are not meant to be exclusive and other steps and methods may also be executed between or concurrently with blocks of the schematic flowchart diagrams.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

One method for using a dataless cache entry includes: identifying a first cache entry in cache memory as a potential cache entry to be replaced according to a cache replacement algorithm, comparing a data value of the first cache entry to a predefined value, and storing a memory address (i.e., an address tag indicating a location in main memory) and one or more state bits of the first cache entry to a dataless cache entry in response to the data value of the first cache entry matching the predefined value. Here, the dataless cache entry in the cache memory may store a memory address and state bits associated with the memory address and the dataless cache entry represents the predefined value, such that the dataless cache entry occupies fewer bits than the first cache entry.

In some embodiments, the method also includes identifying a second cache entry as a potential cache entry to be replaced in response to the data value of the first cache entry not matching the predefined value, comparing a data value of the second cache entry to the predefined value, and storing a memory address and state bits of the second cache entry to a dataless cache entry in response to the data value of the second cache entry matching the predefined value. Here, the dataless cache entry in the cache memory stores a memory address and state bits associated with the memory address and the dataless cache entry represents the predefined value, such that the dataless cache entry occupies fewer bits than the first cache entry.

In certain embodiments, the method includes overwriting the memory address and state bits of the second cache entry in response to transferring the memory address and state bits to the dataless cache entry. In certain embodiments, the method also includes identifying a cache entry for eviction according to the cache replacement algorithm in response to not finding a cache entry in cache memory matching the predefined value and evicting the cache entry.

In various embodiments, the first cache entry is a valid cache entry and the dataless cache entry represents the first cache entry as valid data. In certain embodiments, the method includes overwriting the data value, memory address, and state bits of the first cache entry and/or second cache entry in response to transferring the memory address and state bits to the dataless cache entry. In some embodiments, the method also includes returning the predefined value in response to a cache read hit for the dataless cache entry. In various embodiments, the predefined value is zero.

In some embodiments, the cache memory includes a plurality of cache replacement groups. Here, each cache replacement group may include a plurality of cache entries and at least one dataless cache entry. In such embodiments, identifying a first cache entry in cache memory as a potential cache entry to be replaced according to a cache replacement algorithm includes identifying a cache entry in a cache replacement group and comparing the data value of the first cache entry to the predefined value includes comparing a data value of the cache entry in the cache replacement group. Further, storing a memory address and state bits of the first cache entry to a dataless cache entry in response to the data value of the first cache entry matching the predefined value may include storing a memory address and state bits of the cache entry of the cache replacement group to the dataless cache entry of the cache replacement group in response to the data value of the cache entry of the cache replacement group matching the predefined value.

In some embodiments, the dataless cache entry stores a set of indicator bits that indicate the predefined value. In one embodiment, the set of indicator bits uses a single bit to indicate the data value associated with the memory address tag. In other embodiments, the dataless cache entry contains zero indicator bits.

In certain embodiments, the dataless cache entry is associated with a second memory address prior to storing the memory address and state bits of the first cache entry. In such embodiments, the method may include examining the state bits of the dataless cache entry associated with the second memory address and writing back the predefined value to the second memory address prior to storing the memory address and state bits of the first cache entry in response to the state bits of the dataless cache entry associated with the second memory address indicating modification of the value of the second memory address.

In some embodiments, the method also includes detecting whether a cache write hit matches a memory address stored to the dataless cache entry and converting the cache write hit into a cache write miss in response to the cache write hit matching a memory address stored to the dataless cache entry. In certain embodiments, the method further includes identifying a second cache entry for eviction in the cache memory according to the cache replacement algorithm, transferring the memory address and state bits of the dataless cache entry to the second cache entry and writing data of the cache write hit to the second cache entry. Moreover, the method may also include invalidating the dataless cache entry.

An apparatus for using a dataless cache entry may include a cache memory including a dataless cache entry. Here, wherein the dataless cache entry may store a memory address tag and state bits associated with the memory address tag and the dataless cache entry represents the predefined value. The apparatus may also include a cache controller that identifies a first cache entry in the cache memory as a potential cache entry to be replaced according to a cache replacement algorithm, compares a data value of the first cache entry to a predefined value, and writes a memory address tag and one or more state bits of the first cache entry to the dataless cache entry in response to the data value of the first cache entry matching the predefined value, such that the dataless cache entry occupies fewer bits than the first cache entry.

In some embodiments, the cache controller identifies a second cache entry as a potential cache entry to be replaced in response to the data value of the first cache entry not matching the predefined value, compares a data value of the second cache entry to the predefined value, and stores a memory address and state bits of the second cache entry to a dataless cache entry in response to the data value of the second cache entry matching the predefined value.

In some embodiments, the cache controller identifies a cache entry for eviction according to the cache replacement algorithm in response to not finding a cache entry in cache memory matching the predefined value and evicts the cache entry.

In various embodiments, the first cache entry that is a valid cache entry and the dataless cache entry represents the first cache entry as valid data. In some embodiments, the cache controller returns the predefined value in response to a cache read hit for the dataless cache entry. In various embodiments, the predefined value is zero.

In some embodiments, the cache memory includes a plurality of cache replacement groups, wherein each cache replacement group includes a plurality of cache entries and at least one dataless cache entry. In such embodiments, the cache controller may identify a first cache entry in cache memory as a potential cache entry to be replaced according to a cache replacement algorithm by identifying a cache entry in a cache replacement group. The cache controller may also compare the data value of the first cache entry to the predefined value by comparing a data value of the cache entry in the cache replacement group. Additionally, the cache controller may write a memory address tag and state bits of the first cache entry to a dataless cache entry in response to the data value of the first cache entry matching the predefined value by storing a memory address tag and state bits of the cache entry of the cache replacement group to the dataless cache entry of the cache replacement group in response to the data value of the cache entry of the cache replacement group matching the predefined value.

In some embodiments, the dataless cache entry stores a set of indicator bits that indicate the predefined value. In one embodiment, the set of indicator bits uses a single bit to indicate the data value associated with the memory address tag. In other embodiments, the dataless cache entry contains zero indicator bits.

In certain embodiments, the dataless cache entry is associated with a second memory address prior to storing the memory address and state bits of the first cache entry. In such embodiments, the cache controller may examine the state bits of the dataless cache entry associated with the second memory address and write back the predefined value to the second memory address prior to storing the memory address and state bits of the first cache entry in response to the state bits of the dataless cache entry associated with the second memory address indicating modification of the value of the second memory address.

In some embodiments, the cache controller detects whether a cache write hit matches a memory address tag stored to the dataless cache entry and converts the cache write hit into a cache write miss in response to the cache write hit matching a memory address tag stored to the dataless cache entry. In such embodiments, the cache controller may identify a second cache entry for eviction in the cache memory according to the cache replacement algorithm and transfer the memory address tag and state bits of the dataless cache entry to the second cache entry and writing data of the cache write hit to the second cache entry. In further embodiments, the cache controller may also invalidate the dataless cache entry.

A system for using a dataless cache entry includes a central processing unit ("CPU"), a main memory, a CPU cache and a cache controller, where data from the main memory is fetched to the CPU cache. In various embodiments, the CPU cache may include a set of dynamic-value cache entries and a fixed-value entry. Here, the fixed-value cache entry in the cache memory stores a memory address tag and state bits associated with the memory address tag and the dataless cache entry represents the predefined value, such that the fixed-value cache entry occupies fewer bits than a dynamic-value cache entry.

In various embodiments, the cache controller is configured to identify a first dynamic-value cache entry as a potential cache entry to be replaced according to a cache replacement algorithm and compare a data value of the first dynamic-value cache entry to a predefined value. In response to the data value of the first dynamic-value cache entry matching the predefined value, the cache controller writes a memory address tag and one or more state bits of the first dynamic-value cache entry to the fixed-value cache entry.

In some embodiments, the cache controller is further configured to: identify a second dynamic-value cache entry as a potential cache entry to be replaced in response to the data value of the first dynamic-value cache entry not matching the predefined value. The cache controller may be further configured to compare a data value of the second dynamic-value cache entry to the predefined value and transfer an address tag and state bits of the second dynamic-value cache entry to the fixed-value cache entry in response to the data value of the second dynamic-value cache entry matching the predefined value.

In certain embodiments, the cache controller is configured to overwrite the data value, memory address, and state bits of the second dynamic-value cache entry in response to transferring the memory address and state bits to the fixed-value cache entry. In some embodiments, the cache controller is further configured to: identify a cache entry for eviction according to the cache replacement algorithm in response to not finding a cache entry in cache memory matching the predefined value and evict the cache entry.

In various embodiments, the first dynamic-value cache entry that is a valid cache entry and the fixed-value cache entry represents the first dynamic-value cache entry as valid data. In certain embodiments, the cache controller is configured to overwrite the data value, memory address, and state bits of the first dynamic-value cache entry in response to transferring the memory address and state bits to the fixed-value cache entry. In some embodiments, the cache controller is further configured to return the predefined value in response to a cache read hit for the fixed-value cache entry. In various embodiments, the predefined value is zero.

In some embodiments, the cache memory includes a plurality of cache replacement groups, wherein each cache replacement group includes a plurality of dynamic-value cache entries and at least one fixed-value cache entry. In such embodiments, identifying a first dynamic-value cache entry in cache memory as a potential cache entry to be replaced according to a cache replacement algorithm may include the cache controller identifying a cache entry in a cache replacement group and comparing the data value of the first dynamic-value cache entry to the predefined value may include the cache controller comparing a data value of the cache entry in the cache replacement group. Additionally, transferring an address tag and state bits of the first dynamic-value cache entry to a fixed-value cache entry in response to the data value of the first dynamic-value cache entry matching the predefined value may include the cache controller storing an address tag and state bits of the cache entry of the cache replacement group to the fixed-value cache entry of the cache replacement group in response to the data value of the cache entry of the cache replacement group matching the predefined value.

In some embodiments, the dataless cache entry stores a set of indicator bits that indicate the predefined value. In one embodiment, the set of indicator bits uses a single bit to indicate the data value associated with the memory address tag. In other embodiments, the dataless cache entry contains zero indicator bits.

In some embodiments, the fixed-value cache entry is associated with a second address tag prior to storing the address tag and state bits of the first dynamic-value cache entry. In such embodiments, the cache controller may be further configured to: examine the state bits of the fixed-value cache entry associated with the second address tag and write back the predefined value to the second address tag prior to storing the address tag and state bits of the first dynamic-value cache entry in response to the state bits of the fixed-value cache entry associated with the second address tag indicating modification of the value of the second address tag.

In some embodiments, the cache controller is further configured to: detect whether a cache write hit matches an address tag stored to the fixed-value cache entry and convert the cache write hit into a cache write miss in response to the cache write hit matching an address tag stored to the fixed-value cache entry. In such embodiments, the cache controller may be further configured to: identify a second dynamic-value cache entry for eviction in the cache memory according to the cache replacement algorithm and transfer the address tag and state bits of the fixed-value cache entry to the second dynamic-value cache entry and write data of the cache write hit to the second dynamic-value cache entry. In certain embodiments, the cache controller is further configured to invalidate the fixed-value cache entry.

FIG. 1 is a schematic block diagram illustrating one embodiment of a system 100 for using a dataless cache entry. The system 100 includes a computing device 105 containing a CPU 110, and a main memory 130, which are described below. As depicted, the CPU 110 may include one or more processor cores 115, a CPU cache 120, and a cache controller 125, which are further described below. In certain embodiments, the computing device 105 may also include one or more secondary storage devices 135, one or more removeable storage devices 140, and one or more peripheral devices 145 (e.g., for input and/or output functions, networking, etc.). The depicted computing device 105 is simplified for ease of understanding. One of ordinary skill in the art would recognize that the depicted numbers of CPUs, CPU caches, memory devices, etc. are illustrative only and that other embodiments of the computing device 105 may include different numbers and/or arrangements of components than those shown in FIG. 1.

The CPU cache 120 stores a plurality of cache entries. A cache entry is typically composed of three parts: a block of data, a memory address tag, and one or more state bits (also referred to as "flag bits"). The block of data (also referred to as a "cache block" or "cache line") is a piece of memory data stored in this cache entry. The memory address tag is used to know what particular piece of memory data is stored in this cache entry and is used to determine cache hits and misses on future memory references. As such, the memory address tag is an indicator of a location in the main memory 130. In one embodiment, the memory address tag comprises the full memory address. In certain embodiments, the memory address tag comprises a subset of the full memory address (e.g., a set of least significant bits, alternatively a set of most significant bits). In other embodiments, the memory address tag may be a hash of the full memory address. The state bits keep track of things such as whether or not this cache entry is shared with other caches or exclusive to this one or has been modified or not. In certain embodiments, a state bit is used to indicate whether or not the cache entry is valid. Examples of cache entries are discussed in further detail below with reference to FIGS. 4 and 5A-5C.

Each element of the cache entry takes up space, which ultimately restricts the number of cache entries that make up the CPU cache 120. Typically, the block of data takes up significantly more space than the address tag and state bits, combined. In general, more cache entries in a cache provide an increased cache hit rate and increased performance. Described herein are structures and techniques for reducing the average space used by the cache entries thereby leading to more cache entries and increased performance for the same number of transistors.

While an important aspect of a cache entry is the block of data, it is actually not always needed. If the cache entry is configured to only store one data value which is known in advance (i.e., a predefined value), then the data itself does not need to be stored in the cache entry. Such a cache entry is referred to herein as a "dataless" cache entry or a "fixed-value" cache entry. When this fixed-value cache entry is accessed, it would simply provide its predefined data value. While the "dataless" cache entry is restricted to only holding one data value, it takes up significantly less memory space than a conventional cache entry whose data value is dynamic. Caching methodology that makes good use of this dataless cache entry are disclosed herein.

Because the dataless cache entry is associated with a predefined data value, better cache performance will occur when the predefined data value corresponds to a frequently encountered data value. The most common data value is zero ('0'). In various embodiments, the implied data value of the dataless cache memory entry is zero. Because not all data has a value of zero, other (conventional) cache memory entries are needed that do hold variable data. In various embodiments, the majority of the cache entries are conventional entries storing a "dynamic" data value, e.g., one that changes from one memory location to another and one that can be modified, e.g., due to CPU write operation.

In various embodiments, the CPU cache 120 may comprise a plurality of memory caches organized into various levels. For example, the CPU cache 120 may comprise an L1 cache nearest the processor core 115. In some implementations, the L1 cache may be split into an instruction cache ("L1i") and a data cache ("L1d"). As another example, the CPU cache 120 may comprise an L2 cache. Typically, the L2 cache is larger than the L1 cache, but retrieval from the L2 cache is slower than retrieval from the L1 cache (e.g., L2 has higher latency than L1 cache). The processor core 115 may first check the L1 cache and, if the smaller cache misses, check the next level (L2) of cache. In certain embodiments, the CPU cache 120 may implement a third level (L3) of on-chip memory cache. Again, the L3 cache is typically larger than the L2 and L1 caches but has a higher latency than either the L2 or L1 cache. In various embodiments, the CPU cache 120 may implement additional levels of memory cache. In other embodiments, additional levels of (off-chip) memory cache may be communicatively coupled to the CPU 110, for example, by the high-speed computer bus. Examples of options of memory caches include, but are not limited to L3 caches, L4 caches, and the like. Moreover, additional caches may be implemented in other areas of the computing device 105, for example a secondary storage device 135 may include its own memory cache in order to improve performance.

In various embodiments, the dataless memory cache entries may be used to supplement a group of cache entries. For example, the CPU cache 120 may be divided into a plurality of cache groups or sets. Here, a dataless cache entry may be added as an extra cache entry in each cache replacement group of cache entries. As used herein, a "cache replacement group" refers to a collection of cache entries that are checked simultaneously for cache hits as the referenced memory can be found in any of them.

When a cache miss occurs and an entry needs to be replaced, one of the entries in the cache replacement group is selected, e.g., based on a replacement algorithm implemented by the cache controller 125. The cache controller

125 may implement a known cache replacement policy, including (but not limited to) one of: Least Recently Used, Least Frequently Used, or variants and combinations thereof. Other cache replacement policies may also be used. In certain embodiments, the cache controller 125 may implement a modified cache replacement policy, as described in further detail below, when the CPU cache 120 supports dataless cache entries.

In various embodiments, the dataless cache entries are used in conjunction with cache replacement (e.g., evicting a cache entry). In such embodiments, the cache controller 125 determines whether the data value of the line (e.g., cache block) being replaced is zero (i.e., the cache block contains only zeroes), its tag and state bits are put in the dataless cache entry for that replacement group replacing the one previously put there. This invention therefore keeps these cache entries in the cache longer increasing its hit rate and performance using a smaller area than by just expanding the cache by an entry that stores data.

In one embodiment, the CPU cache 120 may be implemented as a N-way set-associative cache where each memory address in the main memory 130 may be mapped to one entry from a set of N cache entries. Examples of N-way set-associative caches include, but are not limited to, 2-way set-associative cache, 4-way set-associative cache, 8-way set-associative cache, and the like. Where in N-way set associative cache is implemented, each set of N cache entries may correspond to a cache replacement group as discussed above.

Embodiments described herein improve over current technology by providing a "dataless" cache entry having a reduced size compared to normal (e.g., dynamic-value) cache entries. Because the data block in a normal cache entry is typically much larger than the combination of address tag and state bits, multiple fixed value (dataless) cache entries may fit within the same number of bits as a dynamic value cache entry. In some embodiments, the cache controller 125 identifies a first cache entry in the CPU cache 120 as a potential cache entry to be replaced according to a cache replacement algorithm. As noted above, cache replacement may be triggered when a processor core 115 requests data that is not contained in the CPU cache 120, referred to as a "cache miss". The cache controller 125 may implement one or more cache replacement algorithms to identify the first cache entry.

Having identified the first cache entry, the cache controller 125 compares the data value of the first cache entry to a predefined value. Here, the predefined value corresponds to the fixed value of the dataless cache entry implemented by the CPU cache 120. If the data value of the first cache entry matches the predefined value, then the cache controller 125 transfers the first cache entry to the dataless cache entry by storing the address tag and state bits of the first cache entry to the dataless cache entry. The cache controller 125 is discussed in more detail below.

In various embodiments, the computing device 105 includes a main memory 130. In one embodiment, the main memory is implemented as RAM. A processor core 115 may fetch data from the main memory 130, wherein the fetched data is loaded into the CPU cache 120. Moreover, data values in the CPU cache 120 may be written back to the main memory 130 according to a cache write policy. For example, in a "write-back" policy, upon evicting a cache entry from the CPU cache 120, the cache controller 125 may determine whether the data value of the cache entry was modified (e.g., by examining the state bits) and, if modified, write the modified value back to a location in main memory 130 corresponding to the cache entry. In other embodiments, the cache controller 125 may implement a "write-though" policy where every write to the CPU cache 120 causes a write to the main memory 130.

In various embodiments, the computing device 105 includes one or more secondary storage devices 135. Generally, the secondary storage device 135 is a non-volatile computer readable storage device, wherein data is loaded into main memory 130 from the secondary storage device 135 and/or written to the secondary storage device 135 from the main memory 130. Examples of secondary storage devices 135 include, but are not limited to, hard disk drives, solid-state drives, and other non-volatile memory media. In various embodiments, the CPU cache 120 may store, and the processor core(s) 115 may operate on, data in main memory 130 associated with the secondary storage device(s) 135. While the examples of the present disclosure describe the memory address tag of a cache entry as indicating a location in the main memory 130, in other embodiments the memory address tag may indicate a location in a secondary storage device 135.

In some embodiments, the computing device 105 may be configured to receive and read/write data to the removable storage device 140. Here, the removable storage device may be a non-volatile storage device that can be removably coupled to the computing device 105. When coupled to the computing device 105, the removable storage device 140 performs similar functions as the secondary storage device 135, in that data may be loaded into main memory 130 from the removable storage device 140 and/or written to the removable storage device 140 from the main memory 130. As such, the CPU cache 120 may store, and the processor core(s) 115 may operate on, data in main memory 130 associated with the removable storage device(s) 140. While the examples of the present disclosure describe the memory address tag of a cache entry as indicating a location in the main memory 130, in other embodiments the memory address tag may indicate a location in a removable storage device 140.

In various embodiments, the computing device 105 includes one or more peripheral devices 145. Here, the peripheral device(s) 145 may be configured to provide input and/or output functions for the computing device 105. In some embodiments, the peripheral device(s) 145 provide a machine-human interface, such as a Graphical User Interface ("GUI"). In some embodiments, the peripheral device(s) 145 provide networking functionality enabling the computing device 105 to communicate with (e.g., remote) electronic devices via wired and/or wireless connections. In various embodiments, data is loaded into main memory 130 from the peripheral device(s) 145 and/or written to the peripheral device(s) 145 from the main memory 130. As such, the CPU cache 120 may store, and the processor core(s) 115 may operate on, data in main memory 130 associated with the peripheral device(s) 145.

Figure 2:
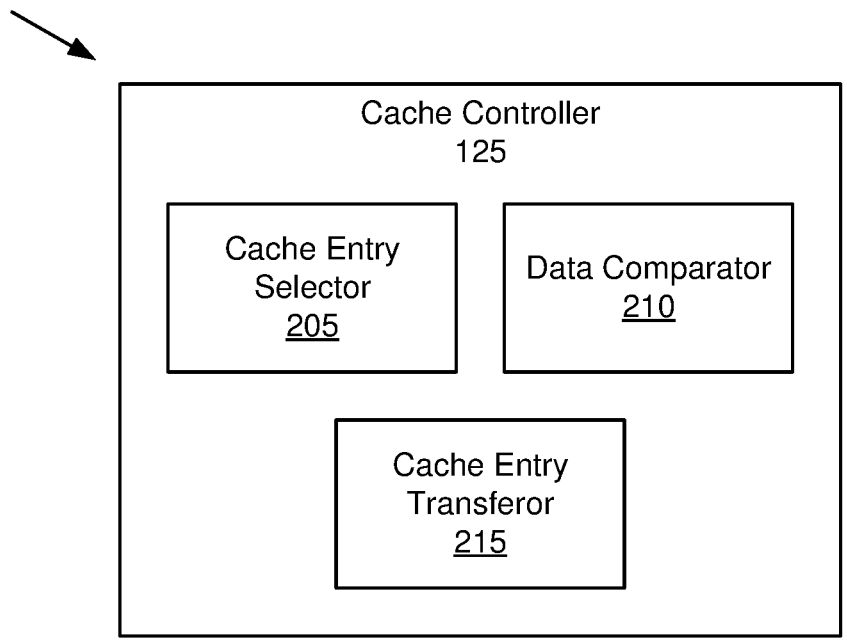
FIG. 2 is a schematic block diagram illustrating one embodiment of a cache management apparatus.

FIG. 2 is a schematic block diagram illustrating one embodiment of a cache management apparatus 200 comprising a cache controller 125. The cache controller 125 may be substantially similar to that described above with reference to FIG. 1. In the depicted embodiment, the cache controller 125 includes a cache entry selector 205, a data comparator 210, and a cache entry transferor 215, which are described below. In some embodiments, the cache controller 125 is embodied with hardware circuits. The hardware circuits may include transistors, registers, memory, logic gates, and the like and may be implemented using an application specific integrated circuit ("ASIC"), a field-programmable gate array ("FPGA"), a Complex Programmable Logic Devices ("CPLD"), or the like. In other embodiments, a portion of the cache controller 125 may be implemented with code stored on computer readable storage media and executed by a processing apparatus capable of executing the code. One of skill in the art will recognize other ways of implementing the cache controller 125.

The cache controller 125 manages a cache memory, such as the CPU cache 120. As discussed herein, the cache memory includes at least one dataless cache entry. The dataless cache entry stores an indication of a memory address (e.g., an address tag or the full memory address) and state bits corresponding to the dataless cache entry. However, the dataless cache entry does not store a cache line (e.g., block of data) for the indicated memory address. Rather, the dataless cache entry is associated with a predefined value, as discussed below.

In some embodiments, the cache controller 125 includes a cache entry selector 205 configured to identify a cache entry in cache memory as a potential cache entry to be replaced. In certain embodiments, the cache entry selector 205 uses a cache replacement algorithm (e.g., determined by a cache replacement policy) in order to select a first cache entry. In certain embodiments, the cache entry selector 205 identifies a second cache entry as a potential cache entry to be replaced if a data value of the first cache entry does not match the predefined value. Still further, the cache entry selector 205 may select a cache entry for eviction according to the cache replacement algorithm if none of the examined cache entries have a data value matching the predefined value.

In some embodiments, the cache controller 125 includes a data comparator 210 configured to compare the data value of a cache entry (e.g., the selected first cache entry) to a predefined value. In various embodiments, the data comparator determines whether the data value in the selected cache entry matches the predetermined value. In one embodiment, the predefined value is zero (i.e., all '0' for the cache block). In some embodiments, the data comparator compares against a single predetermined value. In other embodiments, the data comparator 210 compares against a plurality of predefined values. For example, the "dataless" cache entry may contain a single bit used to indicate one of two predefined data values corresponding to the address tag. In another example, the "dataless" cache entry may contain two bits used to indicate one of four predefined data values corresponding to the address tag. In another example, a value of the data is defined by rule, such as a "0," and there are no data bits in the dataless cache entry and when the dataless cache entry is marked valid, a read of the dataless cache entry returns the value defined by the rules, such as "0."

In one embodiment, the data comparator 210 sends a signal to the cache entry transferor 215 in response to determining that the data value in the selected cache entry matches the predefined value. In another embodiment, the data comparator 210 may indicate that the data value in the selected cache entry matches the predefined value by modifying a state bit or an indictor bit associated with the selected cache entry.

In one embodiment, the data comparator 210 sends a signal to the cache entry selector 205 indicating whether the selected cache entry has a data value that matches the predefined data value. For example, the data comparator 210 may signal the cache entry selector 205 if the selected cache entry has a data value that does not match the predefined data value, wherein the cache entry selector 205 may select a second cache entry as a potential cache entry to be replaced in response to the data value of the first cache entry not matching the predefined value. In response to the cache entry selector 205 selecting a second cache entry, the data comparator 210 may compare the data value of the second cache entry to the predefined value (e.g., to determine whether it matches the predefined value).

In some embodiments, the cache controller 125 includes a cache entry transferor 215 configured to transfer (e.g., write) the memory address and state bits of the selected cache entry into the dataless cache entry, if the data value of the selected cache entry matches the predetermined value. In various embodiments, the dataless cache entry stores a memory address tag and corresponding state bits. The dataless cache entry represents the predefined value and occupies fewer bits than the selected cache entry (e.g., a regular cache entry). In one embodiment, the dataless cache entry stores a single indicator bit to represent the data value corresponding to the memory address tag. In other embodiments, the dataless cache value may store multiple indicator bits to indicate the predefined value. Here, the number of indicator bits is less than the number of bits in a cache line, such that the dataless cache entry occupies fewer bits than a regular cache entry. Note that the dataless cache entry is only used for a cache block whose data value matches the predefined value. In some embodiments, the dataless cache entry does not include any bits representing the data corresponding to the memory address tag, e.g., because the memory address tag can only correspond to one data value (the predefined value) if it is stored in the dataless cache entry.

In certain embodiments, the cache entry transferor 215 adds a dataless cache entry to the cache memory in response to the data value of the first cache entry matching the predefined value, where the added entry is associated with the predefined value and stores the memory address tag and state bits of the first cache entry, but does not store the data value of the first cache entry. In one example, the cache entry transferor 215 adds the dataless cache entry by writing to a location in cache memory designated for dataless cache entries. In another example, the cache entry transferor 215 initializes a dataless cache entry in response to the data value of the first cache entry matching the predefined value. In yet another example, the cache entry transferor 215 writes to a dataless cache entry that was previously initialized but in an invalid state, thereby creating a valid cache entry.

If the dataless cache entry is a valid cache entry at the time the first cache entry is selected and the data comparator 210 determines that the data value of the first cache entry matches the predefined value, then the memory address associated with the dataless cache entry may need to be evicted from cache prior to transferring the first entry to the dataless cache entry (e.g., storing the address tag and state bits). Here, the dataless cache entry may be invalidated and/or the predefined value may be written back to the memory address associated with the dataless cache entry prior to transferring the first entry to the dataless cache entry.

As discussed above, entries in the cache memory may be organized into cache replacement groups, with at least one dataless cache entry added to each cache replacement group. In certain embodiments, one or more of the cache replacement groups may have no dataless cache entry. One example of cache replacement group implementation is a N-way set-associative cache where each set of N cache entries form a cache replacement group. Here, a dataless cache entry may be added to each set, so that each set in the N-way set-associative cache contains N regular cache entries (e.g., dynamic value entries) and one dataless cache entry (fixed-value entry).

In certain embodiments, multiple dataless cache entries may be added to each set. For example, the N-way set-associative cache may be implemented with two or more dataless cache entries for each set of N regular cache entries. As another example, the N-way set-associative cache may be implemented with one dataless cache entry for each regular cache entry in the set. In certain embodiments, the number of dataless cache entries per set is based on the value of N. For example, an 8-way set-associative cache (having sets of 8 regular cache entries) may be implemented with two or more dataless cache entries per set, while a 2-way set-associative cache (i.e., having sets of 2 regular cache entries) may be implemented with only one dataless cache entry per set in order to optimize the tradeoff of space taken vs. improved cache hit rate. In certain embodiments, the number of dataless cache entries per set is based on the length of the cache line (e.g., the size of the block of data stored in the cache entry). As the likelihood of a cache line having the predefined value decreases as the length of the cache line increases, a cache replacement group having a higher likelihood of having more than one cache line with all zeros may have more than one dataless cache entry per set in order to optimize the tradeoff of space taken vs. improved cache hit rate.

Where the cache memory is organized into replacement groups, the cache entry selector 205 may identify the first cache entry (e.g., potential cache entry to be replaced) from a cache replacement group, the data comparator 210 may determine whether the data value of the identified cache entry matches the predefined value, and, if a match, the cache entry transferor 215 may store the memory address tag and state bits into the dataless cache entry of the cache replacement group. In certain embodiments, the cache entry selector 205 may select a second cache entry from the cache replacement group if the first cache entry does not have a data value that matches the predefined value. In such embodiments, the data comparator 210 may check the data value of the second cache entry and the cache entry transferor 215 may transfer the address tag and state bits of the second entry to the dataless cache entry for the cache replacement group if the data value of the second cache entry matches the predefined value. In certain embodiments, the data comparator may examine a plurality of data values stored in cache entries of a cache replacement group to determine whether any match the predefined value. In such embodiments, the data comparator 210 may provide a cache entry index indicating a cache entry (e.g., in the cache replacement group) having a data value that matches the predefined value.

Figure 3:
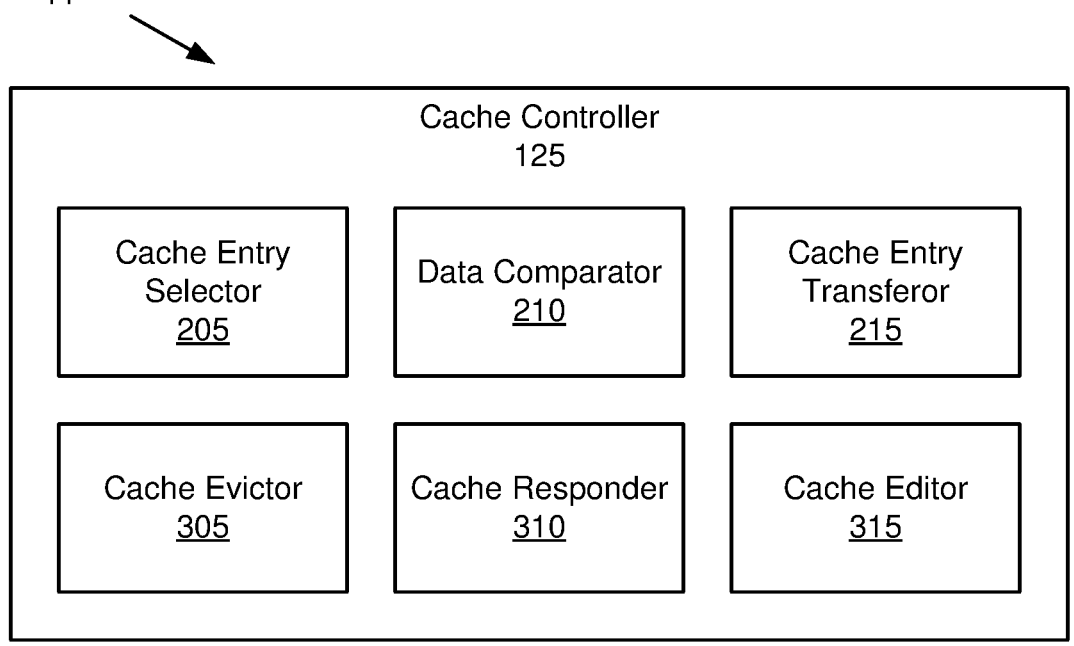
FIG. 3 is a schematic block diagram illustrating another embodiment of a cache management apparatus.

FIG. 3 is a schematic block diagram illustrating a cache management apparatus 300 of a cache controller 125. In the cache management apparatus 300, the cache controller 125 includes a cache entry selector 205, a data comparator 210 and a cache entry transferor 215, which are substantially similar to those described above with regard to the cache management apparatus 200 of FIG. 2. The cache controller 125, in the cache management apparatus 300, also includes a cache evictor 305, a cache responder 310 and a cache editor 315.

The cache evictor 305, in various embodiments, may be configured to evict a cache entry from the memory cache. As discussed above, the cache controller 125 may select a cache entry for replacement (i.e., eviction) in response to a cache miss, in order to make room to load the requested data into cache memory. In various embodiments, the cache evictor 305 receives notification of the cache entry selected for replacement from the cache entry selector 205 and evicts the selected cache entry.

In some embodiments, the cache controller 125 implements a write-back policy where data that is modified while in the cache memory is written back to the main memory only when that data is evicted from the cache memory (i.e., the cache entry holding the modified data is selected for replacement). In some embodiments, the cache evictor 305 may examine the state bits of the cache entry selected for replacement to determine whether the cache entry holds modified data that needs to be written back to main memory prior to evicting the cache entry. Note, however, that if the cache entry selected for replacement has a data value matching a predefined value, then it does not get evicted from the cache memory. Rather, it is transferred to a dataless cache entry. However, if the selected cache entry is replacing one previously stored to the dataless cache entry, then the previously stored dataless cache entry may be evicted from cache memory.

In some embodiments, the dataless cache is valid for a second memory address prior to the cache entry transferor 215 storing the address tag and state bits of the first cache entry. As such, the cache evictor 305 may evict the second memory address from the cache memory prior to the cache entry transferor 215 moving the address tag and state bits storing the address tag and state bits of the first cache entry. In certain embodiments, the cache evictor 305 may examine the state bits of the dataless cache entry associated with the second memory address and write back the predefined value (e.g., zero) to the second memory address (in main memory) in response to the state bits of the dataless cache entry associated with the second memory address indicating modification of the value of the second memory address. The cache evictor 305 may also mark the dataless cache entry as invalid when evicting the second memory address, after which the values (e.g., address tag and state bits) of the first memory address may be written to the dataless cache entry.

The cache responder 310, in various embodiments, may be configured to respond to (data) access requests made to the cache memory by the CPU. For example, if the CPU requests data corresponding to a particular memory address, the cache responder 310 may return the requested data if it is stored in the cache memory. In certain embodiments, the cache responder 310 is configured to detect a cache miss, for example due to the memory address not corresponding to a valid cache entry. Note that a cache miss may be a cache read miss corresponding to a cache read operation, or a cache write miss corresponding to a cache write operation. In certain embodiments, the cache responder 310 is configured to detect a cache hit, for example due to the memory address corresponding to a valid cache entry. Note that a cache hit may be a cache read hit corresponding to a cache read operation, or a cache write hit corresponding to a cache write operation.

In some embodiments, the cache responder 310 returns the predefined value (e.g., to a CPU or processor core) in response to a cache read hit for the dataless cache entry. In various embodiments, the predefined value is zero. Where the dataless cache entry can be associated with more than one predefined value, the cache responder 310 may identify the predefined value associated with the dataless cache entry and return the identified value.

In some embodiments, the cache responder 310 may detect a cache write request for the memory address corresponding to the dataless cache entry. Because the memory address is in cache memory, a cache hit would be returned. However, the data value of the memory address associated with the dataless cache entry cannot be modified while in the dataless cache entry because the dataless cache entry does not store a data value (it only associates the stored address tag with the predefined value). Accordingly, the cache responder 310 cannot return a cache write hit upon detecting a cache write request for the memory address corresponding to the dataless cache entry. In one embodiment, the cache responder 310 converts the cache write hit into a cache write miss.

In response to the cache write miss for the memory address corresponding to the dataless cache entry, the address tag and state bits in the dataless cache entry are transferred to a normal (dynamic value) cache entry. Transferring the memory address corresponding to the cache write request from the dataless cache entry to a normal cache entry may involve selecting a (second) cache entry for eviction in the cache memory according to the cache replacement algorithm. After evicting the memory address associated with the (second) cache entry, the memory address tag and state bits of the dataless cache entry are transferred to the second cache entry (e.g., transferred by the cache entry transferor 215) and the data of the cache write request is written to the second cache entry (e.g., written by the cache editor 315). Moreover, the dataless cache entry may be indicated as invalid after the memory address tag and state bits are transferred to the second cache entry.

The cache editor 315, in various embodiments, may be configured to modify (edit) values of a cache entry. For example, the cache editor 315 may edit the state bits of a cache entry to indicate, e.g., whether the data is modified or whether the cache entry is valid. In some embodiments, the cache editor 315 may write new address tag, state bits, and (for dynamic-value cache entries) a data block in order to load data from main memory.

In one embodiment, the cache editor 315 may edit the state bits of the dataless cache entry to indicate that the dataless cache entry is valid in response to the cache entry transferor 215 storing a memory address tag and state bits to the dataless cache entry. Here, the dataless cache entry represents the first cache entry as valid data. Where the dataless cache entry is valid, the cache responder 310 can return a cache read hit for a memory address corresponding to the address tag stored in the dataless cache entry.

In one embodiment, the cache editor 315 may edit the state bits of the dataless cache entry to indicate that the dataless cache entry is invalid in response to the cache entry transferor 215 transferring the memory address tag and state bits from the dataless cache entry to a regular (dynamic value) cache entry (e.g., so that the data value of the memory address can be modified).

Figure 4:
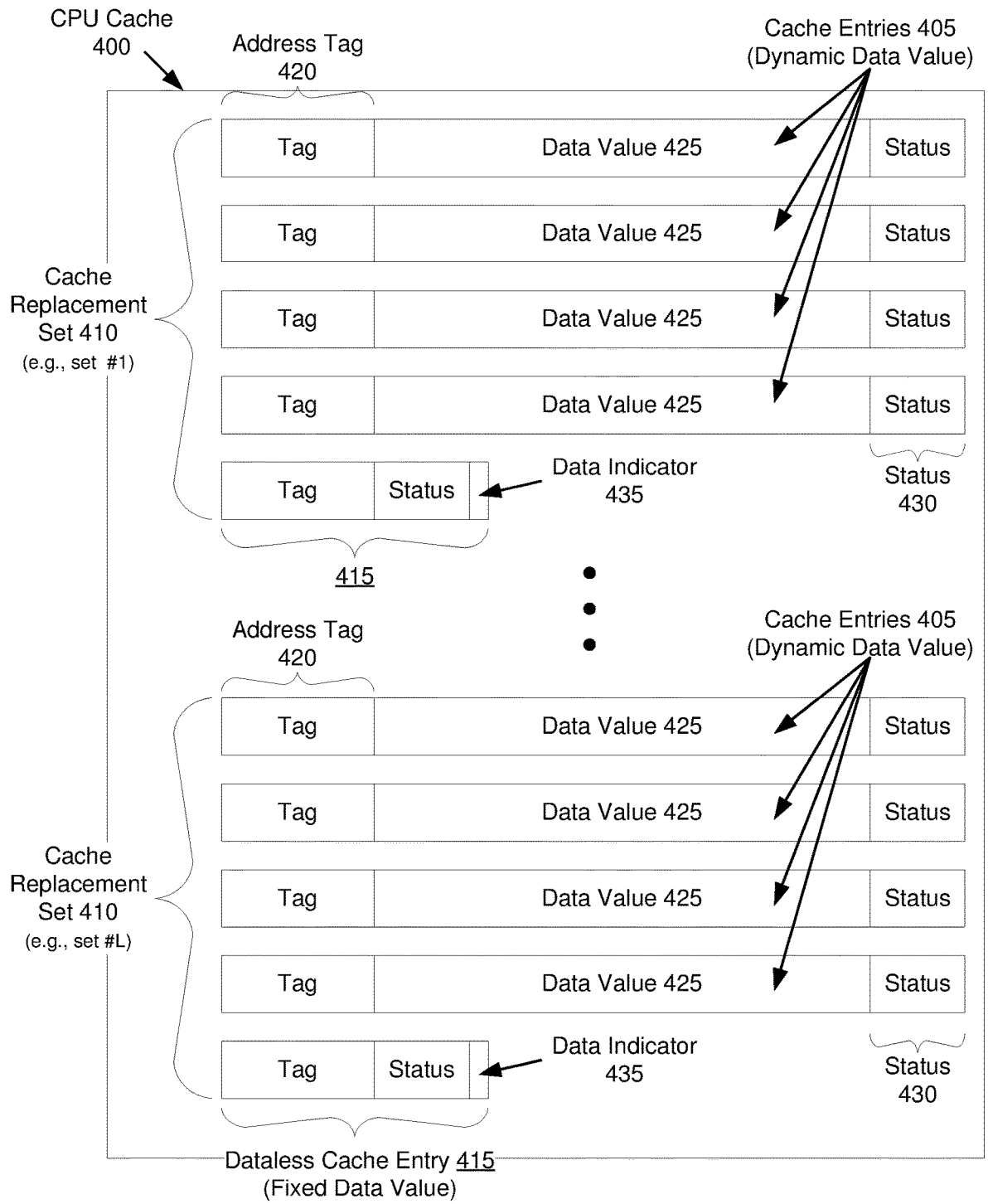
FIG. 4 is a schematic block diagram illustrating one embodiment of a CPU cache that includes a dataless cache entry.

FIG. 4 is a schematic block diagram illustrating a CPU cache 400, according to embodiments of the disclosure. The CPU cache 400 may be one embodiment of the CPU cache 120 described above. The CPU cache 400 comprises multiple cache entries 405 that are arranged into multiple cache replacement sets 410. As depicted, each cache replacement set 410 may be supplemented by a dataless cache entry 415.

The cache entries 405 store an address tag 420, a data value 425, and a status 430 (e.g., comprised of one or more state bits). The dataless cache entry 415 stores an address tag 420 and a status 430. The dataless cache entry 415 is associated with a fixed (e.g., predefined) data value, while the cache entries 405 stores a dynamic data value (e.g., the data value may vary from one cache entry 405 to another and may vary from one address tag to another). In certain embodiments, the dataless cache entry 415 includes a data indicator 435 which may be a set of one or more bits used to denote the fixed value associated with the dataless cache entry 415. In one embodiment, the fixed value is zero. While FIG. 4 shows the dataless cache entry 415 including a data indicator 435, in other embodiments the dataless cache entry 415 does not include a data indicator 435, for example the dataless cache entry 415 may store only an address tag 420 and the status 430 and the dataless cache entry 415 represents the predefined value. For example, the system 100 may recognize that where a dataless cache entry 415 is valid, that the dataless cache entry 415 represents a cache entry with all zeros.

In response to the cache entries 405 in a cache replacement set 410 becoming full (e.g., being valid entries storing data values 425 corresponding to the respective address tags 420), the cache manager (e.g., cache controller 125) must evict an entry in the cache replacement set 410 whenever a new memory address needs to be loaded into the cache replacement set 410. Where the data value 425 of a cache entry 405 that is selected for replacement (according to a cache replacement algorithm) matches the fixed value associated with the dataless cache entry 415, then the address tag 420 and status 430 of the selected cache entry 405 is transferred to the dataless cache entry 415 and data of the new memory address is loaded into the selected cache entry 405.

This CPU cache 400 basically adds an entry to each cache replacement set 410 that keeps track of the last replaced cache entry 405 whose data value matches the predefined value (e.g., zero). If the memory address associated with the dataless cache entry 415 is written to, it must be moved to a regular cache entry 405 in the cache replacement set 410, in which case the dataless cache entry 415 becomes invalid. Most of the time, the dataless cache memory entry 415 will hold a valid line whose data is zero, thereby increasing the number of valid lines in the CPU cache 400 and improving its hit rate and performance, while not increasing the size of the CPU cache 400 as much as adding a regular cache entry 405.

Figure 5A:
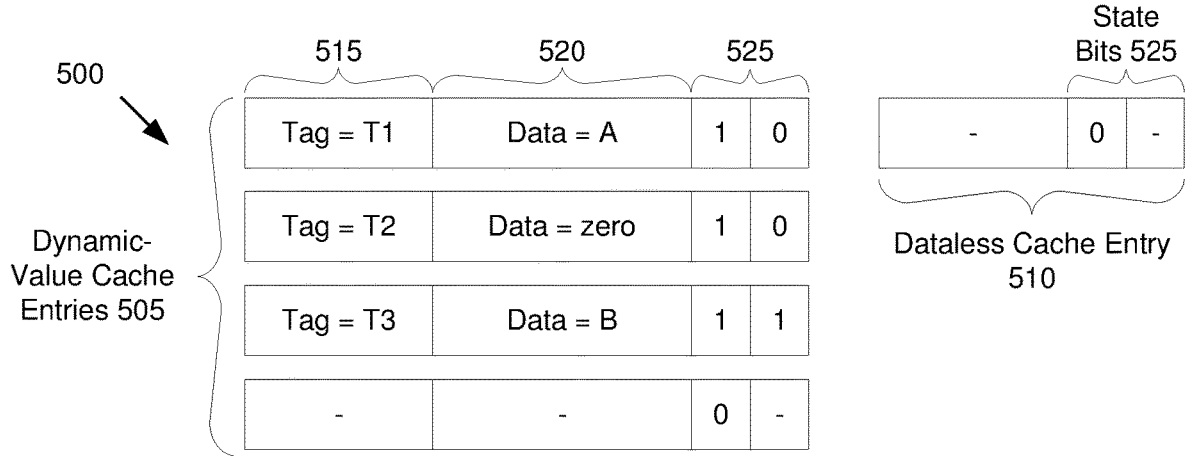
FIGS. 5A-5C are schematic block diagrams illustrating one embodiment of a cache replacement group that implements a dataless cache entry.
Figure 5B:
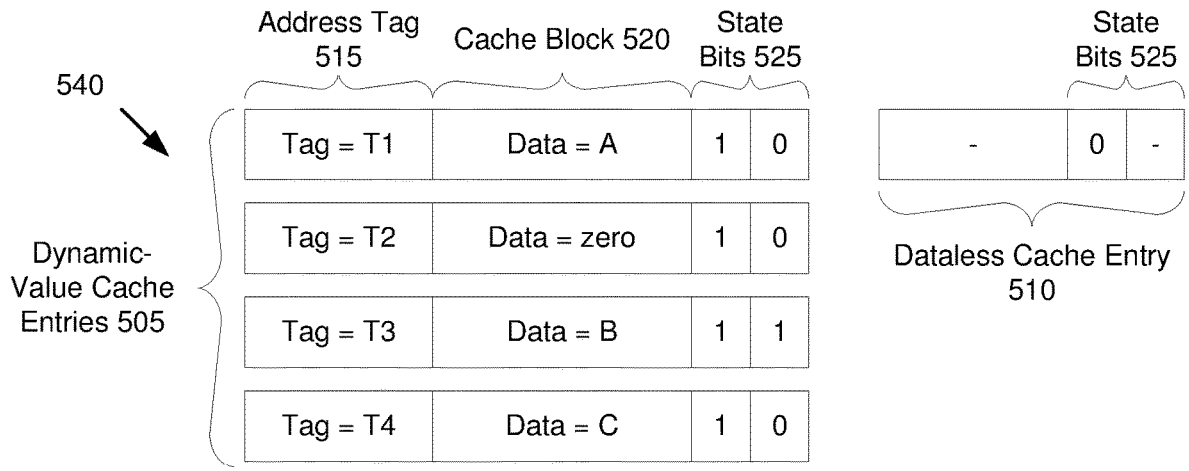
Figure 5C:
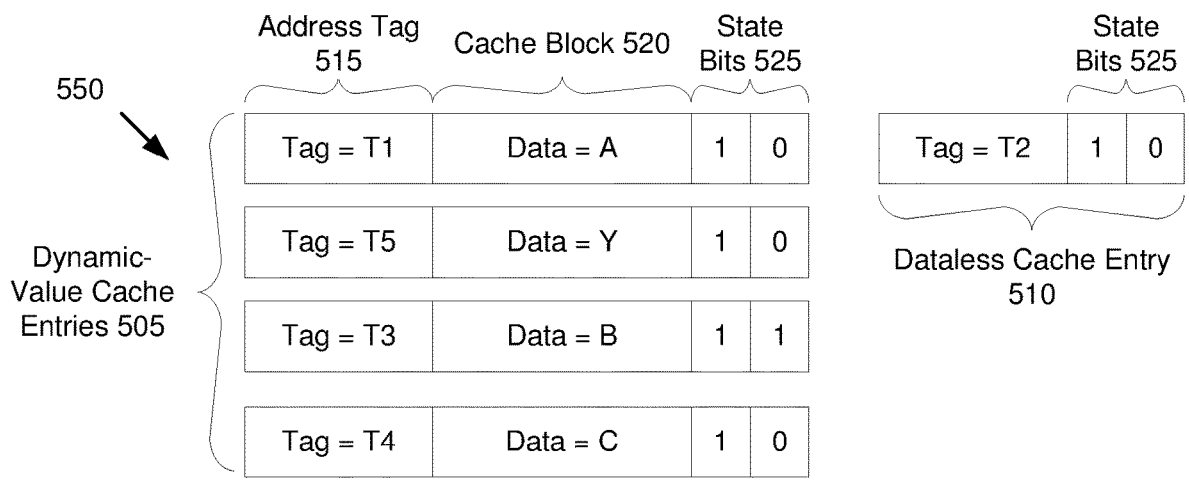

FIGS. 5A-5C illustrate one example of utilizing a dataless cache entry when replacing a cache entry, according to embodiments of the disclosure. FIGS. 5A-5C shows a cache memory comprising four dynamic-value cache entries 505 and a dataless cache entry 510. Each dynamic-value cache entry 505 stores an address tag 515, a cache block 520, and a set of state bits 525. The dataless cache entry 510 also stores an address tag 515 and the set of state bits 525, but does not store a cache block because the dataless cache entry is only used to store the address tag 515 and state bits 525 for a memory address whose cache block value is equal to the predefined value (e.g., zero). Here, the left state bits 525 is used to indicate whether the cache entry holds a valid entry (with '0' indicating an invalid entry and '1' indicating a valid entry), while the right state bit is used to indicate whether the cache entry is 'dirty', meaning its value has been modified and needs to be written back to the main memory (with '0' indicating a 'clean' entry and '1' indicating a 'dirty' entry).

FIG. 5A shows the cache memory at a first time 500 where the cache memory is not yet full. FIG. 5B shows the cache memory at a second time 540 where the dynamic-value cache entries 505 are full, but the dataless cache entry 510 does not store a valid entry. FIG. 5C shows the cache memory at a third time 550 where a dynamic-value entry 505 has been transferred to the dataless cache entry 510.

Referring to FIG. 5A, the depicted cache memory may implement an example set of a 4-way set-associative cache. As shown, the cache memory adds the dataless cache entry 510 as a fifth entry to the set of dynamic-value cache entries 505. Here, the dataless cache entry 510 can only hold a predefined value. In the depicted example, the predefined value is zero ('0').

Initially all five entries of the set are invalid and empty. In the depicted example, the symbol '-' is used to indicate an invalid field. Until the four dynamic-value cache entries 505 of the set become valid, the cache controller (not shown) populates the dynamic-value cache entries 505 as the CPU requests data. Here, the first bit in the state bits indicates whether the entry is valid, and the second bit indicates whether the entry has been modified (i.e., whether it needs to be written back to main memory upon eviction).

FIG. 5B shows the cache memory after all four dynamic-value cache entries 505 in the set are filled with valid entries. When the next cache miss occurs, one dynamic-value cache entry 505 needs to be selected to be replaced. If the selected dynamic-value cache entry has a data value of 0, its address and state bits are moved to the dataless cache entry 510, potentially replacing one previously put there.

While the depicted example shows the dataless cache entry as invalid at the second time 540, if this replaced line in the dataless cache memory entry were valid and had been modified (e.g., 'dirty') as determined by the state bits, it would written back to memory before it is replaced.

FIG. 5C shows the cache memory after the dataless cache entry 510 is filled with a valid entry. From now on, reads that hit the dataless cache entry 510 prevent cache misses and improve performance while returning a data value of 0. However, if a write hits in the dataless cache memory entry, special care must be taken as there is no place to store the written data in this entry. Therefore, it becomes a cache miss that both invalidates the dataless cache entry 510 and displaces a dynamic-value cache entry 505 in the set chosen for replacement.

Figure 6:
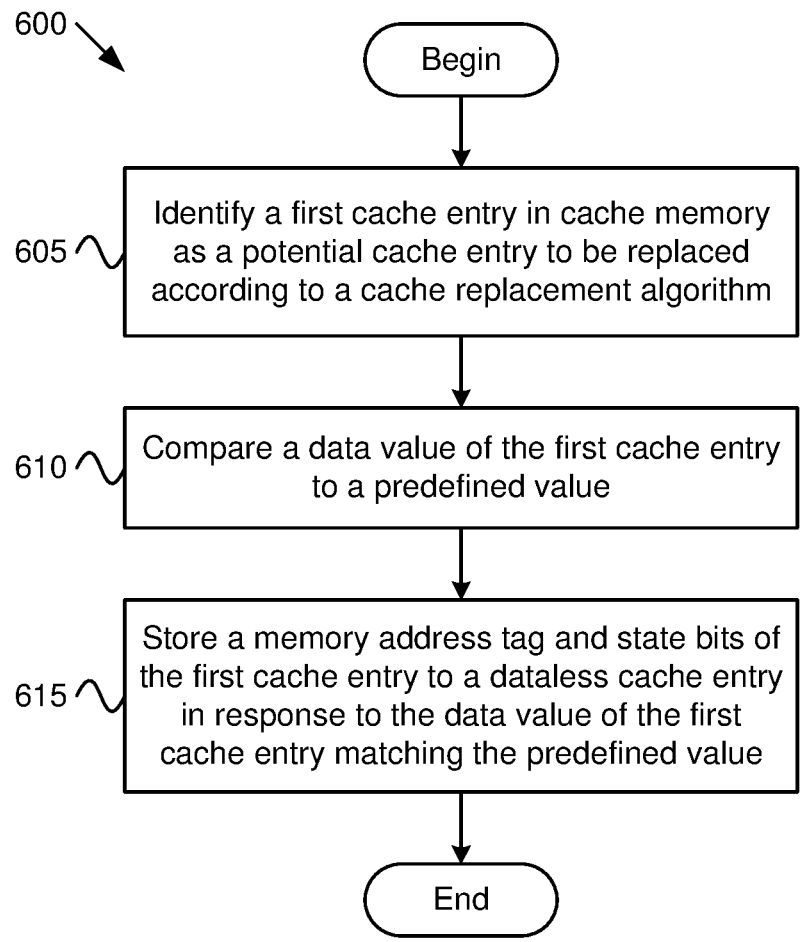
FIG. 6 is a schematic flow chart diagram illustrating one embodiment of a method for using a dataless cache entry.

FIG. 6 is a schematic block diagram illustrating one embodiment of a method 600 for using a dataless cache entry, according to embodiments of the disclosure. In various embodiments, the method 600 may be performed by the cache controller 125, the cache management apparatus 200 and/or the cache management apparatus 300. In some embodiments, the method 600 may be performed using hardware circuitry, such as an ASIC, an FPGA, or the like. In certain embodiments, the method 600 may be performed by a controller executing instructions stored on a computer readable storage medium.

The method 600 begins and identifies 605 a first cache entry in cache memory as a potential cache entry to be replaced according to a cache replacement algorithm. In some embodiments, the cache memory comprises a plurality of cache replacement groups, each having a plurality of cache entries and at least one dataless cache entry. In such embodiments, identifying 605 the first cache entry includes identifying a cache entry in a cache replacement group.

The method 600 compares 610 a data value of the first cache entry to a predefined value. In some embodiments, the predefined value is zero.

The method 600 stores 615 a memory address tag and state bits of the first cache entry to a dataless cache entry in response to the data value of the first cache entry matching the predefined value. The method 600 ends. In some embodiments, the first cache entry is a valid cache entry and the dataless cache entry represents the first cache entry as valid data.

In certain embodiments, the cache memory includes a plurality of cache replacement groups, each having a plurality of cache entries and at least one dataless cache entry. In such embodiments, storing 615 the memory address tag and state bits of the first cache entry includes storing to the dataless cache entry of the cache replacement group to which the first cache entry belongs.

In some embodiments, the dataless cache entry is associated with a second memory address prior to storing the memory address tag and state bits of the first cache entry. In such embodiments, storing 615 the memory address tag and state bits of the first cache entry includes evicting the second memory address from the cache memory prior to storing the memory address tag and state bits of the first cache entry. In certain embodiments, evicting the second memory address from cache memory includes writing back (e.g., to main memory) the predefined value to the second memory address in response to the state bits of the dataless cache entry associated with the second memory address indicating modification of the value of the second memory address.

Figure 7:
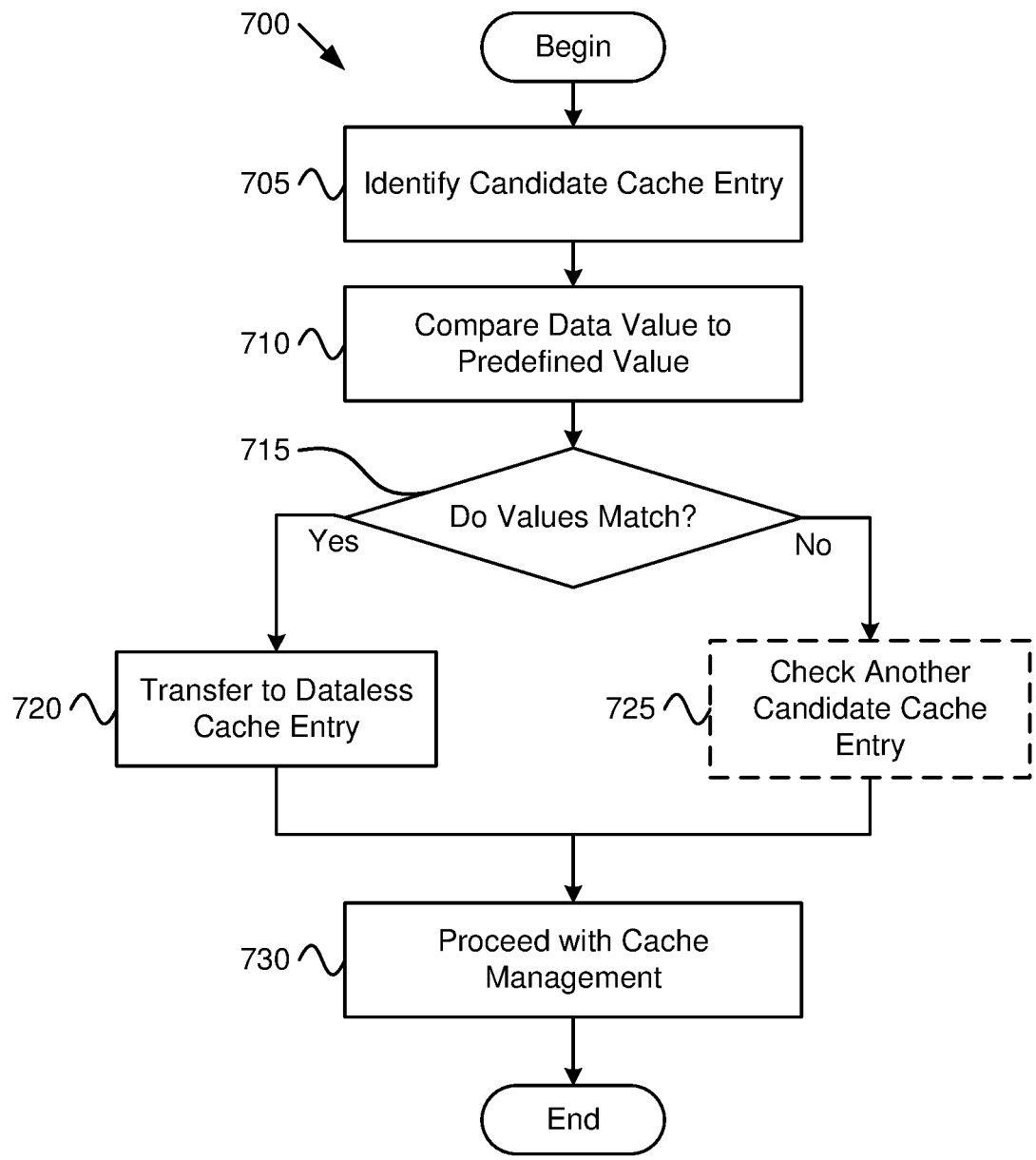
FIG. 7 is a schematic flow chart diagram illustrating another embodiment of a method for using a dataless cache entry.

FIG. 7 is a schematic flow chart diagram illustrating one embodiment of a method 700 for using a dataless cache entry, according to embodiments of the disclosure. In various embodiments, the method 700 may be performed by the cache controller 125, the cache management apparatus 200, and/or the cache management apparatus 300. In some embodiments, the method 700 may be performed using hardware circuitry, such as an ASIC, an FPGA, or the like. In certain embodiments, the method 700 may be performed by a controller executing instructions stored on a computer readable storage medium.

The method 700 begins and identifies 705 a candidate cache entry in cache memory. In certain embodiments, the candidate cache entry is a cache entry to be replaced according to a cache replacement algorithm. In certain embodiments, the candidate cache entry is a cache entry for which a cache write command is buffered. In some embodiments, the cache memory comprises a plurality of cache replacement groups, each having a plurality of cache entries and at least one dataless cache entry. In such embodiments, identifying 705 the candidate cache entry includes identifying a first cache entry in a cache replacement group.

The method 700 compares 710 a data value of the candidate cache entry to a predefined value. In some embodiments, the predefined value is zero. Where the candidate cache entry is a cache entry for which a cache write command is buffered, comparing 710 the data value may include comparing a data value in the write command to the predefined value.

In response to comparing 710 the data value of the candidate cache entry to the predefined value, the method 700 determines 715 whether the values match.

If the data value of the candidate cache entry matches the predefined value, then the method 700 transfers 720 the candidate cache entry to a dataless cache entry. Here, transferring 720 the candidate cache entry includes writing the memory address tag and state bits of the candidate cache entry to the dataless cache entry. However, the data value of the candidate cache entry is not transferred as the dataless cache entry is associated with the predefined value, so that only memory addresses having the predefined data value are stored to the dataless cache entry. Upon transferring 720 the cache entry to the dataless cache entry, the method 700 proceeds 730 with cache management. In various embodiments, proceeding 730 with cache management includes marking the candidate cache entry as invalid and/or overwriting values in the candidate cache entry with new values (e.g., values corresponding to a new memory address retrieved from main memory or from a higher level cache).

However, if the data value of the candidate cache entry does not match the predefined value, the method 700 may optionally check 725 whether another suitable cache entry in the cache memory (e.g., another cache entry in the cache replacement group) has a data value that matches the predefined data value. In such embodiments, if another cache entry has a data value that matches the predefined value, then that cache entry is transferred to the dataless cache entry. Otherwise, if the examined cache entries do not have data values that match the predefined value, then the method 700 proceeds 730 with cache management. In various embodiments, proceeding 730 with cache management includes evicting the candidate cache entry, for example, marking it as invalid and/or overwriting values in the candidate cache entry with new values (e.g., values corresponding to a new memory address retrieved from main memory or from a higher level cache). The method 700 ends.

Figure 8:
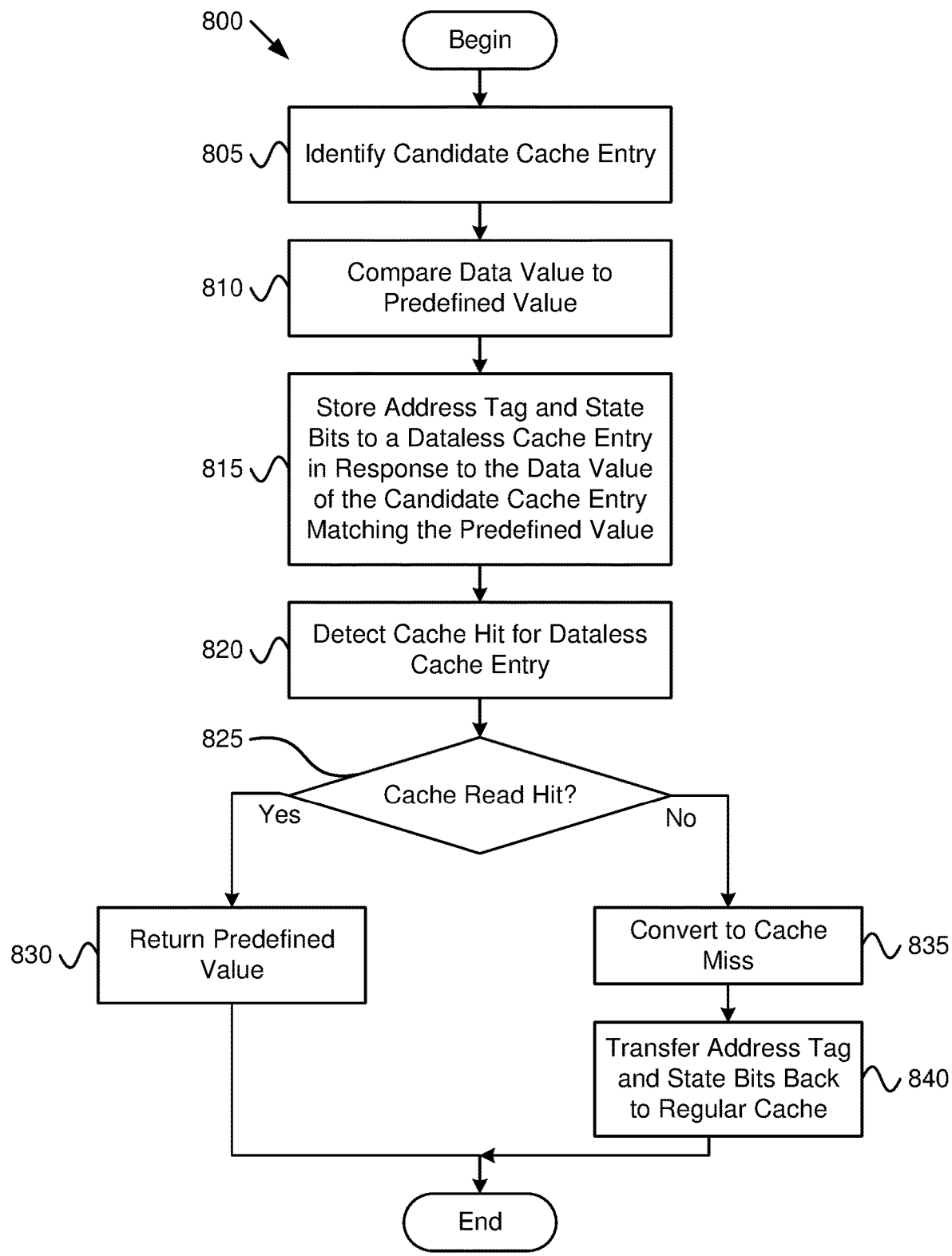
FIG. 8 is a schematic flow chart diagram illustrating another embodiment of a method for using a dataless cache entry.

FIG. 8 is a schematic flow chart diagram illustrating one embodiment of a method 800 for using a dataless cache entry, according to embodiments of the disclosure. In various embodiments, the method 800 may be performed by the cache controller 125, the cache management apparatus 200 and/or the cache management apparatus 300. In some embodiments, the method 800 may be performed using hardware circuitry, such as an ASIC, an FPGA, or the like. In certain embodiments, the method 800 may be performed by a controller executing instructions stored on a computer readable storage medium.

The method 800 begins and identifies 805 a candidate cache entry in cache memory. In certain embodiments, the candidate cache entry is a cache entry to be replaced according to a cache replacement algorithm. In certain embodiments, the candidate cache entry is a cache entry for which a cache write command is buffered. In some embodiments, the cache memory comprises a plurality of cache replacement groups, each having a plurality of cache entries and at least one dataless cache entry. In such embodiments, identifying 805 the candidate cache entry includes identifying a first cache entry in a cache replacement group.

The method 800 compares 810 a data value of the candidate cache entry to a predefined value. In some embodiments, the predefined value is zero. Where the candidate cache entry is a cache entry for which a cache write command is buffered, comparing 810 the data value may include comparing a data value in the write command to the predefined value.

The method 800 stores 815 a memory address tag and state bits of the first cache entry to a dataless cache entry in response to the data value of the first cache entry matching the predefined value. In some embodiments, the first cache entry is a valid cache entry and the dataless cache entry represents the first cache entry as valid data.

In certain embodiments, the cache memory comprises a plurality of cache replacement groups, each having a plurality of cache entries and at least one dataless cache entry. In such embodiments, storing 815 the memory address tag and state bits of the first cache entry includes storing to the dataless cache entry of the cache replacement group to which the first cache entry belongs. In some embodiments, the dataless cache entry is associated with a second memory address prior to storing the memory address tag and state bits of the first cache entry. In such embodiments, storing 815 the memory address tag and state bits of the first cache entry includes evicting the second memory address from the cache memory prior to storing the memory address tag and state bits of the first cache entry.

The method 800 includes detecting 820 a cache hit for the dataless cache entry. In one embodiment, the cache hit corresponds to a cache read request for the memory address associated with the dataless cache entry. In another embodiment, the cache hit corresponds to a cache write request for the memory address associated with the dataless cache entry.

The method 800 includes determining 825 whether the cache hit is a cache read hit. In response to the cache hit being a cache read hit, the method 800 returns 830 the predefined value. However, in response to the cache hit not being a cache read hit, the method 800 converts 835 the cache hit into a cache miss and transfers 840 the address tag and state bits back to a regular cache entry. The method 800 ends.

In various embodiments, transferring 840 the address tag and state bits back to a regular cache entry includes evicting a memory address from the cache replacement group. In some embodiments, transferring 840 the address tag and state bits back to a regular cache entry includes marking the dataless cache entry as invalid.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    identifying a first cache entry in cache memory as a potential cache entry to be replaced according to a cache replacement algorithm;
    comparing a data value of the first cache entry to a predefined value; and
    storing a memory address tag and state bits of the first cache entry to a dataless cache entry in response to the data value of the first cache entry matching the predefined value, wherein the dataless cache entry in the cache memory stores a memory address tag and state bits associated with the memory address tag, wherein the dataless cache entry represents the predefined value, and wherein the dataless cache entry occupies fewer bits than the first cache entry.

2. The method of claim 1, further comprising:
    identifying a second cache entry as a potential cache entry to be replaced in response to the data value of the first cache entry not matching the predefined value;
    comparing a data value of the second cache entry to the predefined value; and
    storing a memory address tag and state bits of the second cache entry to a dataless cache entry in response to the data value of the second cache entry matching the predefined value, wherein the dataless cache entry in the cache memory stores a memory address tag and state bits associated with the memory address tag, wherein the dataless cache entry represents the predefined value, and wherein the dataless cache entry occupies fewer bits than the second cache entry.

3. The method of claim 1, further comprising:
    identifying a cache entry for eviction according to the cache replacement algorithm in response to not finding a cache entry in cache memory matching the predefined value; and
    evicting the cache entry.

4. The method of claim 1, wherein the first cache entry that is a valid cache entry and the dataless cache entry represents the first cache entry as valid data.

5. The method of claim 1, further comprising returning the predefined value in response to a cache read hit for the dataless cache entry.

6. The method of claim 1, wherein the predefined value is zero.

7. The method of claim 1, wherein the cache memory comprises a plurality of cache replacement groups, wherein each cache replacement group comprises a plurality of cache entries and at least one dataless cache entry.

8. The method of claim 7:
wherein identifying a first cache entry in cache memory as a potential cache entry to be replaced according to a cache replacement algorithm comprises identifying a cache entry in a cache replacement group;
wherein comparing the data value of the first cache entry to the predefined value comprises comparing a data value of the cache entry in the cache replacement group; and
wherein storing a memory address tag and state bits of the first cache entry to a dataless cache entry in response to the data value of the first cache entry matching the predefined value comprises storing a memory address tag and state bits of the cache entry of the cache replacement group to the dataless cache entry of the cache replacement group in response to the data value of the cache entry of the cache replacement group matching the predefined value.

9. The method of claim 1, wherein the dataless cache entry stores zero, one or more indicator bits, wherein the indicator bits indicate the predefined value.

10. The method of claim 1, wherein the dataless cache entry is associated with a second memory address prior to storing the memory address and state bits of the first cache entry, the method further comprising:
examining the state bits of the dataless cache entry associated with the second memory address; and
writing back the predefined value to the second memory address prior to storing the memory address and state bits of the first cache entry in response to the state bits of the dataless cache entry associated with the second memory address indicating modification of the value of the second memory address.

11. The method of claim 1, further comprising:
detecting whether a cache write hit matches a memory address stored to the dataless cache entry; and
converting the cache write hit into a cache write miss in response to the cache write hit matching a memory address stored to the dataless cache entry.

12. The method of claim 11, further comprising:
identifying a second cache entry for eviction in the cache memory according to the cache replacement algorithm; and
transferring the memory address and state bits of the dataless cache entry to the second cache entry and writing data of the cache write hit to the second cache entry.

13. The method of claim 12, further comprising invalidating the dataless cache entry.

14. An apparatus comprising:
a cache memory comprising a dataless cache entry, wherein the dataless cache entry stores a memory address tag and state bits associated with the memory address tag, wherein the dataless cache entry represents the predefined value; and a cache controller that:
identifies a first cache entry in the cache memory as a potential cache entry to be replaced according to a cache replacement algorithm;
compares a data value of the first cache entry to a predefined value; and
writes a memory address tag and state bits of the first cache entry to the dataless cache entry in response to the data value of the first cache entry matching the predefined value, wherein the dataless cache entry occupies fewer bits than the first cache entry.

15. The apparatus of claim 14, wherein the first cache entry that is a valid cache entry and the dataless cache entry represents the first cache entry as valid data.

16. The apparatus of claim 14, further comprising returning the predefined value in response to a cache read hit for the dataless cache entry.

17. The apparatus of claim 14, wherein the cache memory comprises a plurality of cache replacement groups, wherein each cache replacement group comprises a plurality of cache entries and at least one dataless cache entry.

18. The apparatus of claim 17:
wherein identifying a first cache entry in cache memory as a potential cache entry to be replaced according to a cache replacement algorithm comprises identifying a cache entry in a cache replacement group;
wherein comparing the data value of the first cache entry to the predefined value comprises comparing a data value of the cache entry in the cache replacement group; and
wherein storing a memory address and state bits of the first cache entry to a dataless cache entry in response to the data value of the first cache entry matching the predefined value comprises storing a memory address and state bits of the cache entry of the cache replacement group to the dataless cache entry of the cache replacement group in response to the data value of the cache entry of the cache replacement group matching the predefined value.

19. The apparatus of claim 14, wherein the cache controller further:
detects whether a cache write hit matches a memory address tag stored to the dataless cache entry; and
converts the cache write hit into a cache write miss in response to the cache write hit matching a memory address tag stored to the dataless cache entry.

20. A system comprising:
a central processing unit ("CPU");
a main memory;
a CPU cache comprising a set of dynamic-value cache entries and a fixed-value entry, wherein the fixed-value cache entry in the CPU cache stores a memory address tag and state bits associated with the memory address tag, wherein the dataless cache entry represents the predefined value, and wherein the fixed-cache entry occupies fewer bits than a dynamic-value cache entry, wherein data from the main memory is fetched to the CPU cache; and
a cache controller that:
identifies a first dynamic-value cache entry as a potential cache entry to be replaced according to a cache replacement algorithm;
compares a data value of the first dynamic-value cache entry to a predefined value; and
writes a memory address tag and state bits of the first dynamic-value cache entry to the fixed-value cache entry in response to the data value of the first dynamic-value cache entry matching the predefined value.

* * * * *